(12) United States Patent
Al-Amri

(10) Patent No.: US 9,234,598 B2
(45) Date of Patent: Jan. 12, 2016

(54) SYSTEM, METHOD AND APPARATUS FOR COMBINED BALL SEGMENT VALVE AND CHECK VALVE

(71) Applicant: Saudi Arabian Oil Company, Dhahran (SA)

(72) Inventor: Omar M. Al-Amri, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 57 days.

(21) Appl. No.: 14/273,166

(22) Filed: May 8, 2014

(65) Prior Publication Data
US 2015/0323087 A1 Nov. 12, 2015

(51) Int. Cl.
*F16K 15/18* (2006.01)
*F16K 15/03* (2006.01)
*F16K 15/04* (2006.01)

(52) U.S. Cl.
CPC ............. *F16K 15/033* (2013.01); *F16K 15/04* (2013.01); *F16K 15/181* (2013.01); *F16K 15/188* (2013.01); *Y10T 137/87917* (2015.04); *Y10T 137/88054* (2015.04)

(58) Field of Classification Search
CPC ....... F16K 15/03; F16K 15/04; F16K 15/181; F16K 15/183; F16K 15/188; Y10T 137/88054; Y10T 137/87917
USPC ............................................. 137/613, 614.2
See application file for complete search history.

(56) References Cited

U.S. PATENT DOCUMENTS 3,068,903 A 12/1962 Haenky et al.
3,491,796 A * 1/1970 Scaramucci ............. F16K 5/06
  137/614.2
4,846,212 A * 7/1989 Scobie .................... F16K 1/446
  134/167 C
5,373,868 A 12/1994 Rodriguez
5,551,479 A 9/1996 Graves
(Continued)

FOREIGN PATENT DOCUMENTS

GB    2157809 A    10/1985
GB    2223829 A  * 4/1990
(Continued)

OTHER PUBLICATIONS

PCT International Search Report and the Written Opinion of the International Searching Authority dated Jul. 23, 2015; International Application No. PCT/US2015/029854; International Filing Date: May 8, 2015.

*Primary Examiner* — Kevin Lee
(74) *Attorney, Agent, or Firm* — Bracewell & Giuliani LLP; Constance Gall Rhebergen

(57) ABSTRACT

A valve apparatus including a check valve and a ball segment valve is provided within a fluid system for handling a flammable working fluid. The valve apparatus is arranged such that flapper doors of the cheek valve longitudinally overlaps a ball segment of the ball segment valve when each are in respective open positions such that the valve apparatus maintains a face-to-face dimension of a standard ball valve. The valve apparatus can thus provide positive isolation and directional fluid control in a congested fluid system with space savings over single valves. An isolated chamber is defined between the flapper doors and the ball segment when each is in a respective closed position. A non-flammable fluid is injected into the isolated chamber to urge the flapper doors and ball segment toward the closed positions to thereby provide a safe environment for performing maintenance operations on downstream fluid components.

18 Claims, 6 Drawing Sheets

(56) References Cited

U.S. PATENT DOCUMENTS

| | | | | |
|---|---|---|---|---|
| 6,098,659 A * | 8/2000 | Mannis | ............... | F16K 5/0407 137/614.17 |
| 6,220,290 B1 * | 4/2001 | Lomax | ............... | F16K 5/0668 137/613 |
| 6,349,736 B1 * | 2/2002 | Dunmire | ............... | E03B 7/077 137/15.19 |
| 6,550,495 B1 * | 4/2003 | Schulze | ............... | F16K 17/38 137/457 |
| 7,445,025 B2 | 11/2008 | Shafique et al. | | |
| 8,381,578 B2 | 2/2013 | Sweeney | | |
| 8,561,642 B2 * | 10/2013 | Schutz | ............... | B65D 77/0466 137/527.6 |
| 2004/0206404 A1 | 10/2004 | Yang | | |
| 2006/0191636 A1 | 8/2006 | Choi | | |
| 2007/0204917 A1 | 9/2007 | Clayton et al. | | |
| 2011/0260090 A1 | 10/2011 | Jones | | |
| 2013/0025711 A1 | 1/2013 | Russell | | |

FOREIGN PATENT DOCUMENTS

| | | |
|---|---|---|
| GB | 2233739 A | 1/1991 |
| JP | H11304018 A | 11/1999 |
| WO | 2009020286 A1 | 2/2009 |
| WO | 2012145606 A2 | 10/2012 |

* cited by examiner

SYSTEM, METHOD AND APPARATUS FOR COMBINED BALL SEGMENT VALVE AND CHECK VALVE

BACKGROUND OF THE INVENTION

1. Field of the Invention

Embodiments of the present invention relate generally to valves for controlling flow of a working fluid through it fluid system. In particular, example embodiments of the invention relate to a combination of a ball segment valve and a spring-assisted, dual plate check valve, which together provide redundant or "double-block" sealing to facilitate maintenance of downstream fluid components of the fluid system.

2. Description of the Related Art

In many industrial applications, ball valves and check valves are used to selectively permit and restrict fluid flow through a conduit. Generally, a ball valve includes a curved or spherical member that can be rotated 90 degrees to move the ball valve between open and closed configurations. An opening through the spherical member is aligned with the conduit to open the ball valve, and is rotated out of alignment with the conduit to close the ball valve. The spherical member maintains contact with a pair of annular or circular valve seats that prevent fluid leakage around the spherical member. A check valve, often described as a one-way valve, is placed within the conduit to permit fluid flow in a first direction and to restrict fluid flow in a second opposite direction. Generally, a check valve includes a flapper or other closure member arranged to open in response to fluid pressure applied by a working fluid on a first side thereof and to close in response to fluid pressure on an opposite side.

Both ball valves and check valve have been placed adjacent one another in various applications to prevent unwanted backflow and to provide positive closure of a conduit. One application where this arrangement is generally ineffective is in positive energy isolation. In this application, all potentially hazardous energy sources, such as flammable, hydrocarbon-based working fluids, are identified and isolated to provide a safe environment for performing maintenance or repair activities. One acceptable option for positive energy isolation is known as "double block and bleed." This term of art is commonly used in the pipeline and petroleum refining industry to describe establishing two positive seals in a conduit and opening a bleed port between the seals. Any leakage of the working fluid past one of the seals is contained by the other seal and may exit through the bleed port.

Although a ball valve by itself may, in some instances, be used to establish the two positive seals for a double block and bleed arrangement, e.g., one seal at each of the two annular valve seats, a check valve is generally ineffective to serve in a double block and bleed arrangement. Because a check valve generally opens in response to a fluid pressure of the working fluid, a sealing force provided by the check valve is generally no greater than a force provided by the pressure of the working fluid. In some applications, this relatively low sealing force is insufficient to provide a safe working environment for welding or other maintenance activities on downstream fluid components. A demand exists for a valve arrangement that at is effective for positive energy isolation and for the prevention of backflow. Also, there is a demand for a valve arrangement that provides redundant closure members within a package that provides weight, space and cost savings over single valves.

SUMMARY OF THE INVENTION

Described herein are apparatuses, systems and methods for controlling a flow of fluid through a fluid system. A valve apparatus is provided within a fluid system for handling a flammable working fluid. The valve apparatus includes a spring-assisted, dual plate check valve and a ball segment valve arranged such that a flapper door of the check valve longitudinally overlaps a ball segment of the ball segment valve when each are in respective open positions. Thus, the valve apparatus maintains a face-to-face dimension of a standard ball valve, and thus enables positive isolation and directional fluid control in a congested fluid system. The valve apparatus offers space, cost and weight savings over single valves.

An isolated chamber is defined between the flapper door and the ball segment when each is in its respective closed position. A non-flammable fluid is injected into the isolated chamber to urge the flapper door and ball segment toward the closed positions with sufficient force to thereby provide a safe environment for performing maintenance operations on downstream fluid components.

According to one aspect of the invention, a valve apparatus includes a ball segment valve housing and a check valve housing. The check valve housing is coupled to the ball segment valve housing such that a longitudinal opening is defined through the ball segment valve housing and the check valve housing. A ball segment is disposed within the ball segment valve housing. The ball segment is operable to be rotated to a closed position wherein a generally curved end of the ball segment is in sealing engagement with a ball segment valve seat disposed within the ball segment valve housing to prevent the flow of a working fluid through an outlet of the longitudinal opening. The ball segment is also operable to be rotated to an open position wherein the generally curved end of the ball segment is at least partially disengaged with the ball segment valve seat to permit flow of the working fluid through the outlet. At least one flapper door is disposed within the check valve housing. In some embodiments, the at least one flapper door includes a pair of flapper doors. The at least one flapper door is operable to be rotated gradually to a closed position wherein the at least one flapper door is in sealing engagement with a flapper valve seat to prevent flow of the working fluid through an inlet to the longitudinal opening in a first direction. The at least one flapper door is longitudinally spaced from the ball segment when the at least one flapper door and the ball segment are both in their respective closed positions to define an isolated chamber within the longitudinal opening between the at least one flapper door and the ball segment. The at least one flapper door is also operable to be rotated to an open position wherein the at least one flapper door permits flow of the working fluid through inlet in is second direction. The at least one flapper door extends from the check valve housing into the ball segment valve housing such that the at least one flapper door longitudinally overlaps the ball segment when the at least one flapper door and the ball segment are both in their respective open positions.

In some embodiments, the valve apparatus further includes a bleed valve extending between the isolated chamber and an exterior of the valve apparatus. In some embodiments, the ball segment extends less than a Pull circumference and engages only a single ball segment valve seat. in some embodiments, the ball segment is operable to be rotated about a pivot axis that is generally orthogonal to a longitudinal axis extending through the longitudinal opening, and the at least one flapper door is operable to be rotated about a flapper axis that is generally orthogonal to the pivot axis of the ball segment.

As indicated above, in some embodiments the check valve is a dual-plate check valve wherein the at least one flapper door includes a pair of flapper doors. Each of the pair of flapper doors is operable to rotate toward one another to a central location within the longitudinal opening. A biasing member, e.g., a torsion spring, is disposed within the cheek valve housing, and is operable to urge the pair of flapper doors to the closed position.

According to another aspect of the invention, a fluid system for handling a flammable working fluid is provided. The fluid system includes, an upstream fluid component, a downstream fluid component, a source of a pressurized non-flammable fluid and a valve apparatus. The valve apparatus has an inlet fluidly coupled to the upstream component and an outlet fluidly coupled to the downstream component such that a flow path is defined between the upstream fluid component and the downstream component through the valve apparatus. The valve apparatus includes a ball segment operable to be rotated to a closed position wherein a generally curved end of the ball segment is in sealing engagement with a ball segment valve seat to prevent flow of the working fluid through the outlet, and operable to be rotated to an open position wherein the generally curved end of the ball segment is at least partially disengaged with the ball segment valve seat to permit flow of the working fluid through the outlet. The valve apparatus further includes at least one flapper door disposed upstream of ball segment. The at least one flapper door is operable to be rotated to a closed position wherein the at least one flapper door is in sealing engagement with a flapper valve seat to prevent flow of the working fluid through the inlet in is first direction, and operable to be rotated to an open position wherein the at least one flapper door is at least partially disengaged with the flapper valve seat to permit flow of the working fluid through the inlet in a second direction. An isolated chamber is defined between the at least one flapper door and the ball segment when the at least one flapper door and the ball segment are both in their respective closed positions. A bleed port extends between the isolated chamber and an exterior of the valve apparatus. The bleed port is fluidly coupled to the source of the pressurized non-flammable fluid to permit the non-flammable fluid to pressurize the isolated chamber and thereby urge the ball segment toward the ball segment valve seat and at least one flapper door toward the flapper valve seat.

In some embodiments, the source of the pressurized non-flammable fluid comprises a pump operable to adjust a pressure of the non-flammable fluid within the isolated chamber. The pump is operable to provide the non-flammable fluid to the isolated chamber at a fluid pressure of at least 10,000 psi. In some embodiments, the non-flammable fluid includes a PTFE impregnated grease or paste.

In some embodiments, the at least one flapper door extends toward the ball segment in the open position thereof such that the at least one flapper door longitudinally overlaps the ball segment when the at least one flapper door and the ball segment are both in their respective open positions. In some embodiments, the downstream component includes at least one of a dehydrator, a separator and an accumulator pressure vessel operable to maintain the working fluid at a preselected pressure therein.

According to another aspect of the invention, a method of fluidly isolating a downstream fluid component from an upstream fluid component in a fluid system for handling a flammable working fluid to thereby facilitate safely maintaining the downstream fluid component includes the steps of (a) providing a check valve at downstream location with respect to the upstream component, the check valve including at least one flapper door operable to be rotated to a closed position wherein the at least one flapper door is in sealing engagement with a flapper valve seat to prevent flow of the working fluid in a first (upstream) direction, and operable to be rotated to an open position wherein the at least one flapper door is at least partially disengaged with the flapper valve seat to permit flow of the working fluid in a second (downstream) direction, (b) providing a ball segment valve at a downstream location with respect to the check valve, wherein the downstream location with respect to the check valve is an upstream location with respect to the downstream component, the ball segment valve including a ball segment operable to be rotated to a closed position wherein a generally curved end of the ball segment is in sealing engagement with a ball segment valve seat to prevent flow of the working fluid through the ball segment valve, and operable to be rotated to an open position wherein the generally curved end of the ball segment is fully or partially disengaged with the ball segment valve seat to permit flow a the working fluid through the ball segment valve, (c) inducing the ball segment to rotate to the closed position thereof, (d) inducing the at least one flapper door to rotate to the closed position thereof, and (e) providing a pressurized non-flammable fluid to an isolated chamber defined between the at least one flapper door and the ball segment to thereby urge the ball segment toward the ball segment valve seat and at least one flapper door toward the flapper valve seat.

In some embodiments, the step of providing the check valve comprises providing a biasing member in the check valve operable to urge the at least one flapper door toward the flapper valve seat, and wherein the step of inducing the at least one flapper door to rotate to the closed position thereof comprises interrupting a supply of the working fluid to the check valve such that an upstream force supplied by the biasing member is sufficient to move the at least one flapper door to the closed position.

In some embodiments, the method further includes the stop of adjusting a fluid pressure of the non-flammable fluid within the isolated chamber to thereby adjust a scaling force applied by the at least one flapper door against the flapper valve seat and a sealing force applied by the ball segment against the ball segment valve seat.

In some embodiments, the method further includes the step of extracting working fluid from the isolated chamber subsequent to the steps of inducing the ball segment to rotate to the closed position thereof and inducing the at least one flapper door to rotate to the closed position thereof.

In some embodiments, the method further includes the steps of performing hot work operations on the downstream component while the non-flammable fluid is provided to the isolated chamber, subsequently extracting the non-flammable fluid from the isolated chamber, and returning the at least one flapper door and the ball segment to the respective open positions thereof. In some embodiments, the step of returning the at least one flapper door and the ball segment to the respective open positions thereof comprises establishing a longitudinal overlap between the at least one flapper door and the ball segment.

BRIEF DESCRIPTION OF THE DRAWINGS

So that the manner in which the above-recited features, aspects and advantages of the invention, as well as others that will become apparent, are attained and can be understood in detail, a more particular description of the invention briefly summarized above may be had by reference to the embodiments thereof that are illustrated in the drawings that form a part of this specification. It is to be noted, however, that the appended drawings illustrate only preferred embodiments of the invention and are, therefore, not to be considered limiting of the invention's scope, for the invention may admit to other equally effective embodiments.

DETAILED DESCRIPTION OF THE EXEMPLARY EMBODIMENTS

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art.

Figure 1:
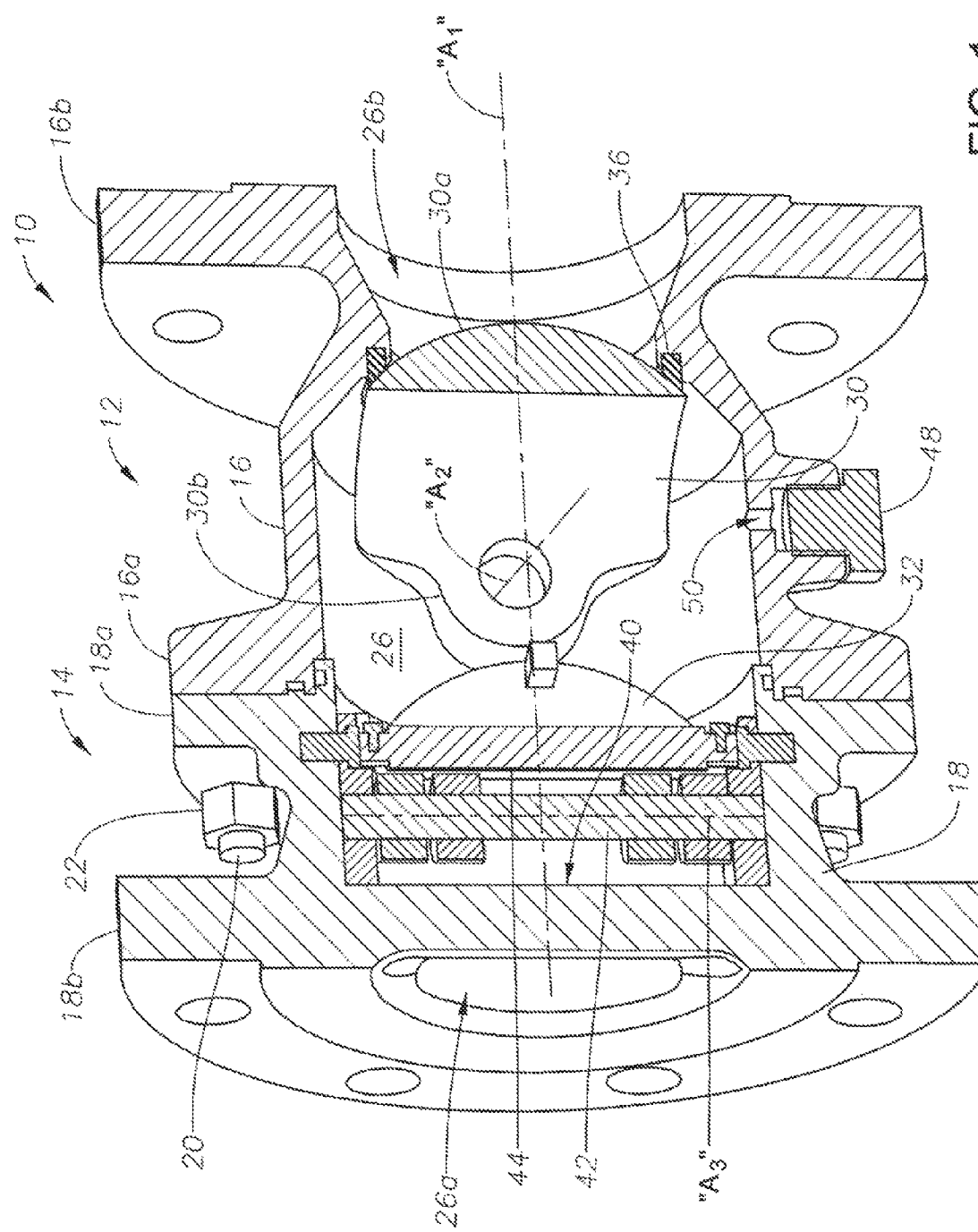
FIG. 1 is a cross-sectional, perspective view of a valve apparatus including a ball segment valve and a check valve in accordance with an example embodiment of the present invention.

Referring to FIG. 1, valve apparatus 10 is constructed in accordance with an example embodiment of the present invention. Valve apparatus 10 generally includes a ball segment valve 12 and a check valve 14 coupled thereto. Ball segment valve housing 16 and check valve housing 18 can be formed or cast from any suitable material such as brass, iron or steel, and include respective interfacing inner radial flanges 16a, 18a. Fasteners such as bolts 20 and nuts 22 couple inner radial flanges 16a, 18a together to secure ball segment valve 12 to check valve 14. In other embodiments (not shown) ball segment valve housing 16 and check valve housing 18 are constructed as a single, unitary body, machined or cast as single piece of material. Outer radial flanges 16b, 18b are provided to couple valve apparatus 10 to a conduit or other system components (see, e.g., FIG. 5). In other embodiments, male and/or female threaded connectors or other coupling mechanisms are provided as known in the art.

Figure 2:
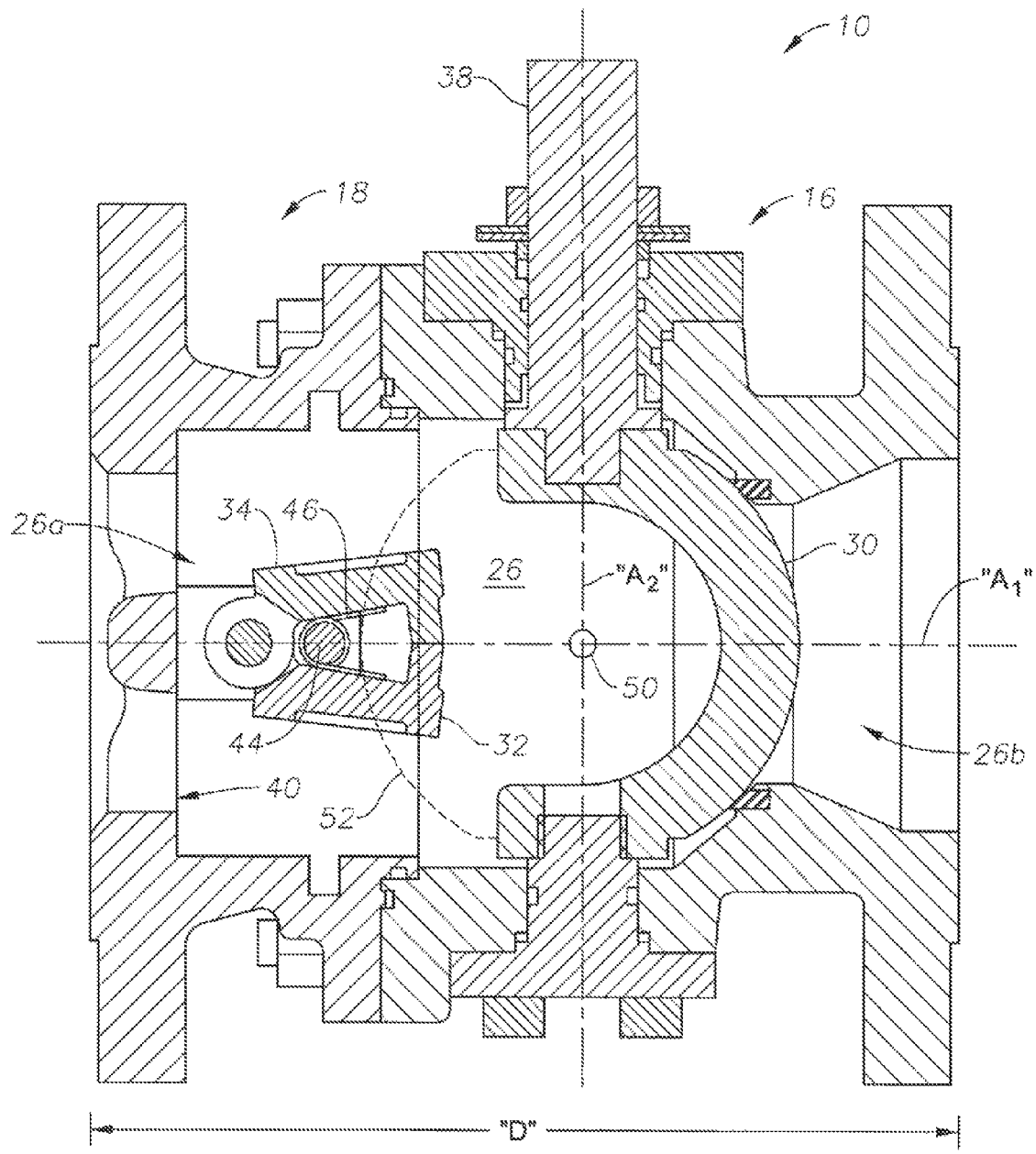
FIG. 2 is a cross-sectional, top view of the valve apparatus of FIG. 1 illustrating the check valve in an open configuration and the ball segment valve in a closed configuration.

Valve apparatus 10 defines a bore or longitudinal opening 26 extending therethrough along a longitudinal axis "$A_1$." Longitudinal opening 26 includes inlet 26a within check valve housing 18 and outlet 26b within ball segment valve housing 16, and defines a flow path extending through valve apparatus 10. Closure members are provided within longitudinal opening 26 for selectively permitting and restricting fluid flow through valve apparatus 10. The closure members include a ball segment 30 within ball segment valve 12 and a pair of flapper doors 32, 34 (flapper door 34 is best illustrated in FIG. 2) disposed within check valve 14.

Ball segment 30 includes a spherical or generally curved end 30a and pivot end 30b. Generally curved end 30a is configured to engage ball segment valve seat 36 to form a fluid seal therewith. Ball segment valve seat 36 is constructed of an elastomeric, ceramic, metallic or other material, and is generally annular or circularly shaped. The fluid seal formed between generally curved end 30a and ball segment valve seat 36 prevents fluid flow through outlet 26b of longitudinal opening 26. Pivot end 30b of ball segment 30 is pivotally coupled to ball segment valve housing 16 by a valve stem 38 (FIG. 2). Valve stem 38 extends to an exterior of ball segment valve housing 16, and permits an operator to rotate ball segment 30 ninety degrees to move the ball segment valve 12 between open and closed configurations as described in greater detail below with reference to FIGS. 3 and 4. Ball segment 30 rotates about a pivot axis "$A_2$," that is generally orthogonal to axis "$A_1$." In some embodiments, valve apparatus 10 is arranged such that both axes "$A_1$" and "$A_2$" lie in a horizontal plane.

Ball segment 30 is described as a "segment" since the generally spherical shape extends only to one lateral side of the ball segment 30 rather than about to full circumference. Thus, ball segment 30 engages only a single ball segment valve seat 36. As appreciated by those skilled in the art, valves are often provided with a full ball (not shown) that engages a pair of valve seats disposed on opposite lateral sides of a pivot axis. In other embodiments (not shown), ball segment valve 12 is replaced by a full ball valve.

Flapper door 32 is disposed within check valve housing 18 adjacent inlet 26a of longitudinal opening 26. Flapper doors 32 and 34 are rotated to the open position illustrated by a fluid flowing into longitudinal opening 26 through inlet 28. Similarly, flapper doors 32 and 34 are rotated into a closed position (see FIG. 4) by action of a biasing member 46 (FIG. 2) such as a torsion spring, e.g., acting in a direction toward inlet 26a from within longitudinal opening 26. When in the closed position, flapper doors 32, 34 engage flapper valve seat 40, which is constructed of an elastomeric, ceramic and/or metallic material to form a fluid seal with flapper doors 32, 34 when in the closed position. Flapper doors 32, 34 rotate on axel 42 extending along a flapper axis "$A_3$." Flapper axis "$A_3$" is generally orthogonal to both longitudinal axis "$A_1$" and pivot axis "$A_2$," and is arranged centrally through longitudinal opening 26 to generally bisect inlet 26a. Flapper door 34 is also pivotally supported by axel 42 and is operable to cooperate with flapper door 32 to completely close inlet 26a when both flapper doors 32, 34 are in closed positions.

Shaft 44 extends though longitudinal opening 26 in a generally parallel relation with respect to axel 42. Flapper doors 32, 34 abut shaft 44 when in a fully open position such that shaft 44 provides a limit to the rotation of flapper doors 32, 34. In some embodiments, a biasing member 46 (FIG. 2) such as a leaf spring, a torsion spring, or another mechanism is supported on shaft 44 to urge flapper doors 32, 34 in an upstream direction toward the flapper valve seat 40.

A removable drain plug 48 is provided within bleed port 50 defined in the ball segment housing 16. Bleed port 50 extends to an exterior of ball segment housing 16 and is disposed longitudinally between ball valve seat 36 and flapper valve seat 40. Thus, any fluid trapped within longitudinal opening 26 between ball segment 30 and flapper doors 32, 34 is removable though bleed port 50. In some embodiments, valve apparatus 10 is arranged such that bleed port 50 is disposed at a lower-most point of ball segment valve housing 16 to permit fluid to drain front longitudinal opening 26 under the influence of gravity.

Referring now to FIG. 2, flapper doors 32, 34 extend out of check valve housing 18 into the ball segment valve housing 16 when hopper doors 32, 34 are in the fully open position. The flapper doors 32, 34 extend into the space defined by a full circumference of the ball segment 30 as indicated by dashed line 52. Since ball segment 30 extends less than the full circumference, there is no interference between flapper doors 32, 34 and ball segment 30. Thus, ball segment 30 permits valve apparatus 10 to maintain a smaller face-to-face dimension "D" than a valve apparatus (not shown) employing a full ball valve and a check valve.

In the configuration illustrated in FIG. 2, fluid entering longitudinal opening 26 through inlet 26a is prohibited from exiting through outlet 26b by ball segment 30. Fluid may exit through bleed port 50 when drain plug 48 removed.

Figure 3:
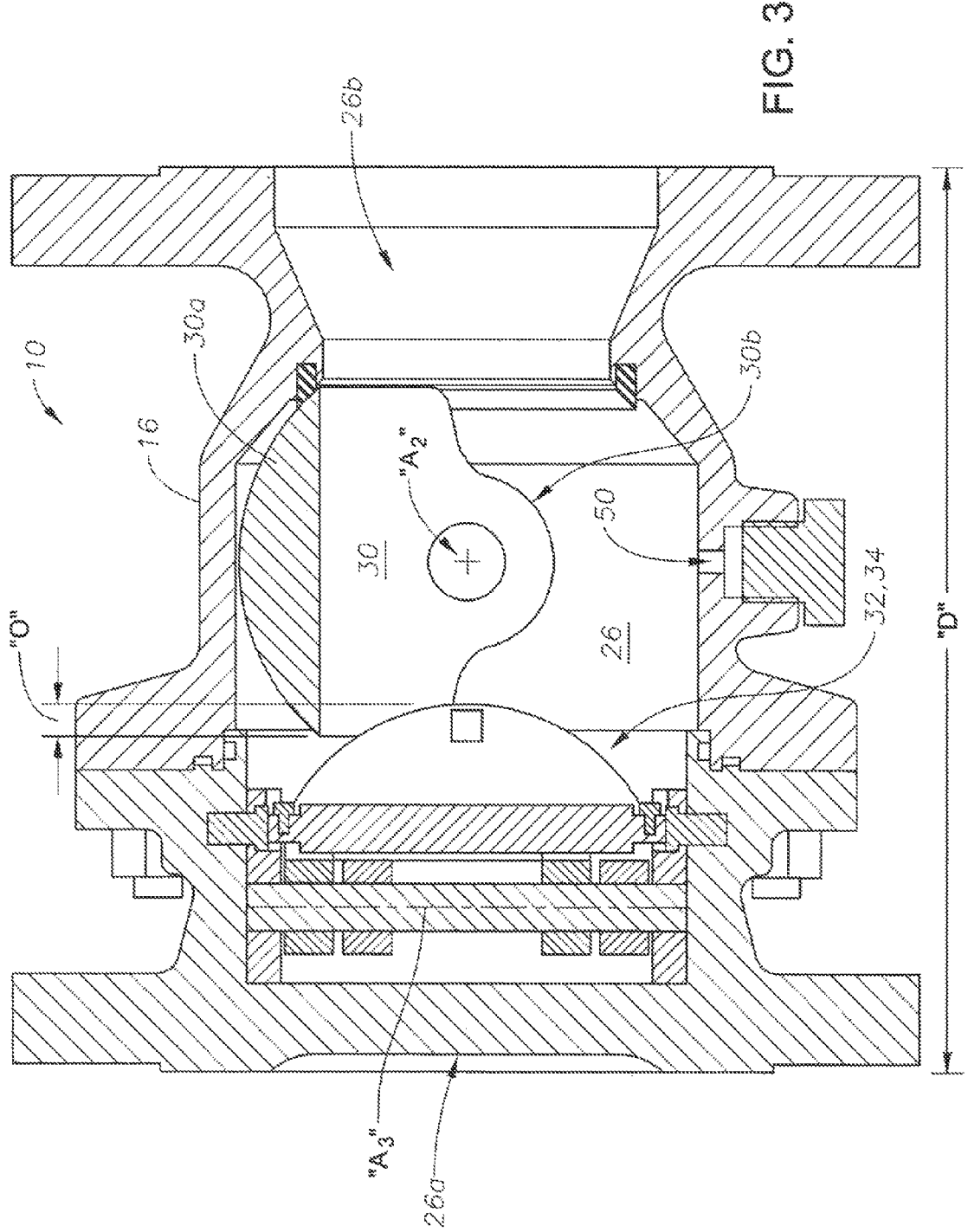
FIGS. 3 and 4 are cross-sectional, side views of the valve apparatus of FIG. 1 in fully open and fully closed configurations respectively.

As illustrated in FIG. 3, valve apparatus 10 is arranged in a fully open or operational configuration wherein a working fluid may pass freely through longitudinal opening 26 between inlet 26a and outlet 26b. Ball segment 30 is rotated to a fully open position wherein generally curved end 30a is disposed within an upper region of ball segment valve housing 16 opposite bleed port 50. Flapper doors 32, 34 are also rotated to fully open positions toward one another to a central vertical plane bisecting longitudinal opening 26. Ball segment 30 and flapper doors 32, 34 longitudinally overlap one another as indicated by dimension "O." Ball segment 30 and flapper doors 32, 34 do not interfere with one another since flapper doors 32, 34 are arranged to rotate about vertical axis "$A_3$" and open toward a central location within longitudinal opening 26, and since ball segment 30 rotates about horizontal axis "$A_2$" such that the generally curved end 30a is disposed above the flapper doors 32, 34. This arrangement including longitudinal overlap "O" permits ball segment 30 and flapper doors 32, 34 to be sufficiently close to one another in a longitudinal direction to permit valve apparatus 10 to maintain face-to-face dimension "D" of a standard isolation ball valve, while additionally providing the capabilities of check valve 14.

When valve apparatus 10 is arranged such that bleed port 50 is at a lower-most point of ball segment valve housing 16, the generally curved end 30a is disposed above the flow path defined through the longitudinal opening 26 when rotated to the open position. Since pivot end 30b is supported on two lateral sides of ball segment valve housing 16 (see FIG. 2) and since flapper doors 32, 34 open toward a central plane bisecting the ball segment 30, the fluid flow path through the longitudinal opening is generally symmetrical underneath generally curved end 30a of ball segment 30. Since gravity acts on the working fluid in a direction opposite the generally curved end 30a, this arrangement will provide fewer obstructions and permit more laminar flow than an arrangement where generally curved end 30a is at either lateral side or at the bottom of ball segment valve housing 16.

Figure 4:
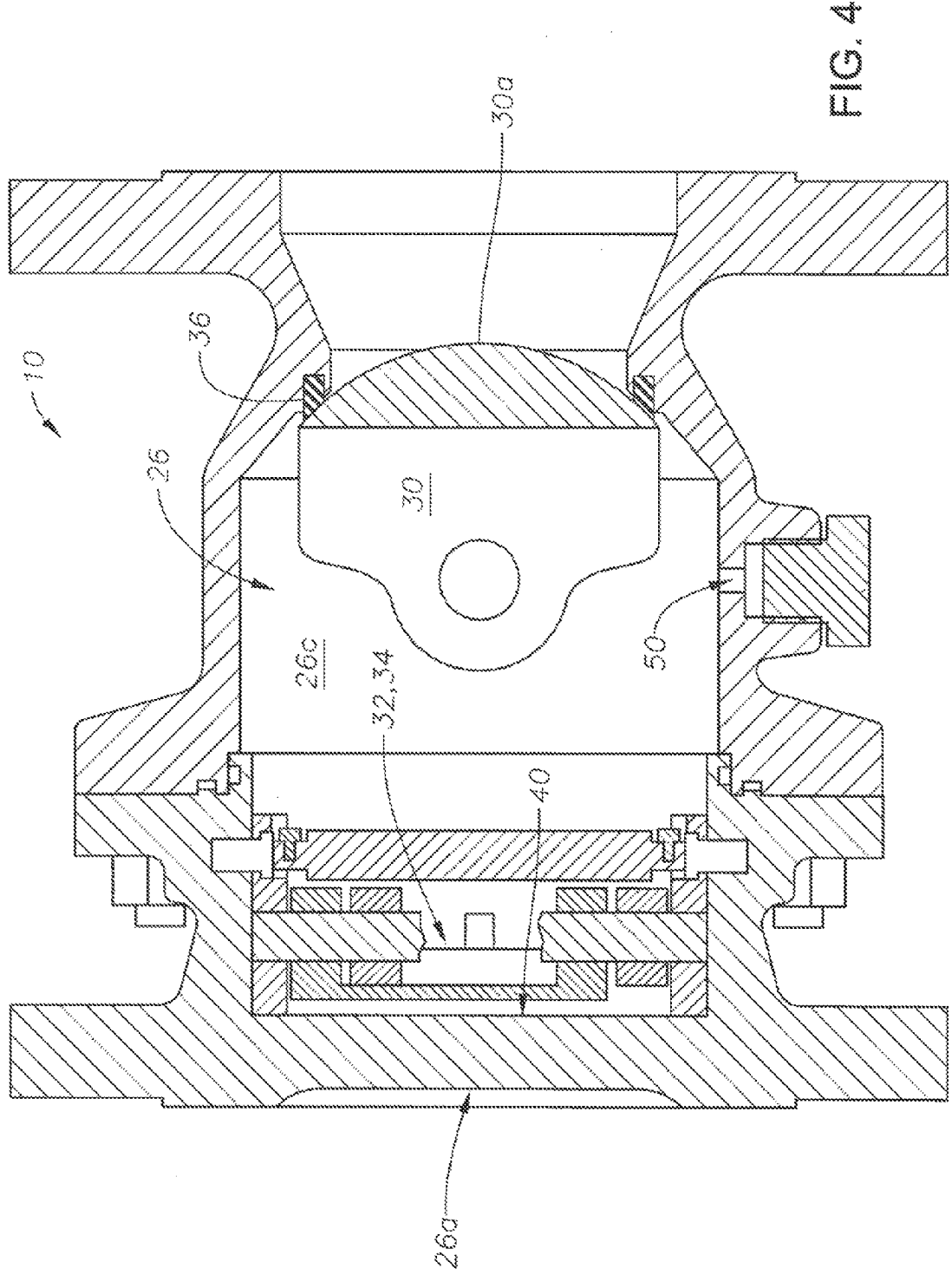

Referring now to FIG. 4, valve apparatus 10 is arranged in fully a closed or maintenance configuration. Ball segment 30 is rotated to a fully closed position wherein generally curved end 30a engages ball valve seat 36 forming a fluid seal therewith. Similarly, flapper doors 32, 34 are rotated to a fully closed position wherein the flapper doors engage flapper valve scat 40 forming a fluid seal therewith. The flapper doors 32, 34 are operable to rotate to the fully closed position when a fluid pressure at inlet 26a applies an downstream three on the flapper doors 32, 34 that is less than the upstream force applied by biasing member 46 (FIG. 2). In the closed or maintenance position, longitudinal opening 26 defines an isolated chamber 26c disposed longitudinally between the flapper valve seat 40 and the ball segment valve seat 36. Bleed port 50 extends between isolated chamber 26c and an exterior of valve apparatus 10.

Figure 5:
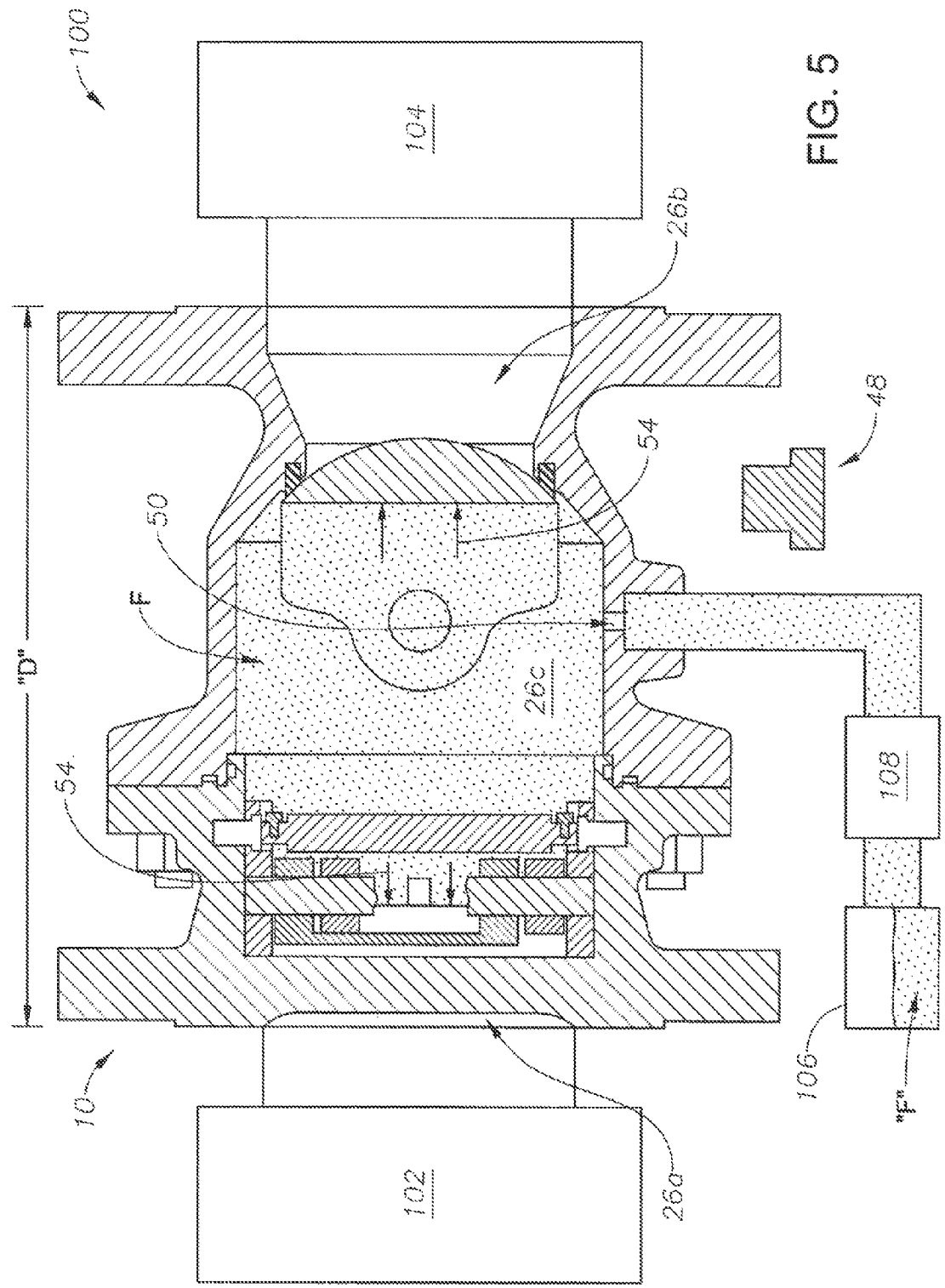
FIG. 5 is a schematic view of a fluid system employing the valve apparatus of FIG. 1 disposed between upstream fluid components and downstream fluid components in accordance with an example embodiment of the present invention.
Figure 6:
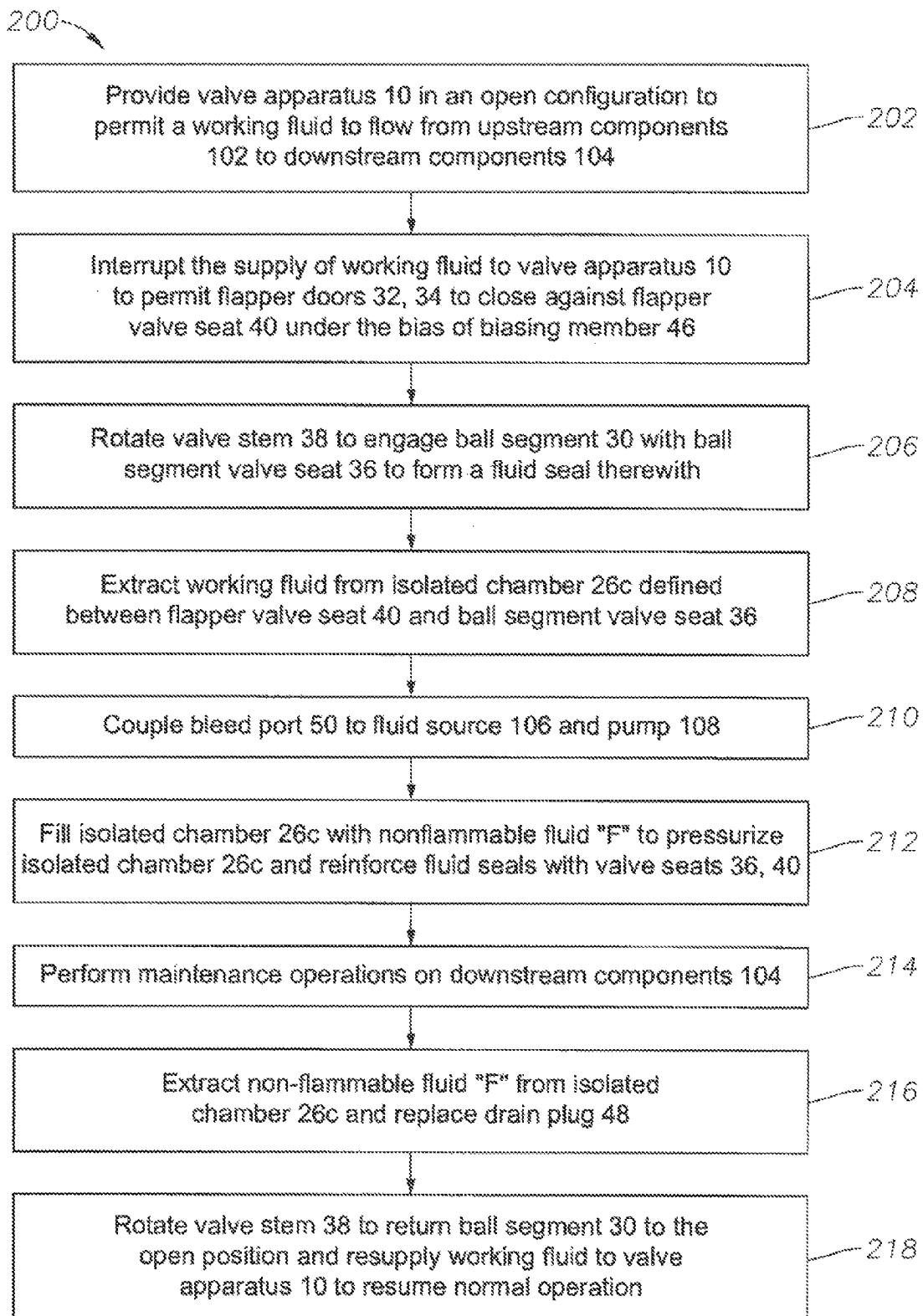
FIG. 6 is a flow diagram illustrating a method of fluidly isolating the downstream components from the upstream fluid components of FIG. 5 to facilitate safely maintaining the downstream fluid components in accordance with an example embodiment of the present invention.

Referring to FIG. 5, valve apparatus 10 is incorporated into fluid system 100. In some embodiments, fluid system 100 handles a working fluid (not shown) such as a flammable, hydrocarbon based fluid. Inlet 26a is fluidly coupled to upstream fluid component or components 102 and outlet 26b is fluidly coupled to downstream fluid component or components 104. Space available between upstream fluid components 102 and downstream fluid components 104 can be limited in many congested fluid systems 100 in use in the offshore energy and marine industries. Face-to-race dimension "D" of a standard ball valve permits valve apparatus 10 provide isolation and backflow prevention capabilities in many applications where only the isolation of a ball valve had previously been provided. In some embodiments, upstream fluid components 102 include pumps and compressors and downstream fluid components 104 include a separator, a dehydrator, an accumulator pressure vessel operable to maintain the working fluid at a preselected pressure therein, or other offshore, or refinery equipment.

With drain plug 48 is removed, bleed port 50 is fluidly coupled to a fluid source 106 and a pump 108. Together, fluid source 106 and pump 108 comprise a pressurized source of a non-flammable fluid "F" such as a PTFE impregnated heavy grease or paste. In some embodiments, non-flammable fluid "F" can include the commercially available lubricants and sealants such as Ball Valve Sealant #5050, available from Sealweld® Corporation having offices in Alberta, Canada. Pump 108 is operable to inject fluid "F" into isolated chamber 26c defined in valve apparatus 10 and adjust a pressure of the non-flammable fluid "F" disposed therein. In some embodiments, pump 108 is operable to provide the non-flammable fluid "F" to the isolated chamber 26c at a pressure of about 10,000 psi or greater. In some embodiments, check valves (not shown) or other flow control components are be provided between fluid source 106, pump 108, and/or bleed port 50 and are operable to maintain the fluid pressure within isolated chamber 26c.

Referring to FIGS. 3 through 6, an example embodiment of an operational procedure 200 tot fluidly isolating downstream fluid components 104 from upstream fluid components 102 in fluid system 100 to facilitate safely maintaining downstream fluid components 104 is described. Initially, valve apparatus 10 is provided (step 202) arranged in the operational or open configuration (FIG. 3) such that flow of the working fluid is permitted through valve apparatus 10 from upstream fluid components 102 to downstream fluid components 104. The working fluid is provided at the inlet 26a at a sufficient pressure to overcome the upstream biasing force provided by biasing member 46 (FIG. 2), and ball segment 30 is disposed in the open configuration at the upper region of ball segment valve housing 16. As indicated above, in some embodiments, the working fluid is a flammable hydrocarbon, which may pose a danger to maintenance operations on downstream fluid components 104.

When maintenance is performed that requires welding or other "hot work" operations, e.g., on downstream fluid components 104, the flammable working fluid is isolated from the operations by moving valve apparatus 10 to the fully closed or maintenance position (see FIGS. 4 and 5). The supply of the working fluid is interrupted (step 204) such that the upstream force supplied by biasing member 46 is sufficient to move the flapper doors 32, 34 to the closed position where flapper doors 32, 34 contact flapper valve seat 40. Ball segment 30 is rotated to the closed position (step 206) in contact with ball segment valve seat 36 by rotating valve stem 38 ninety degrees.

With the valve apparatus 10 in the maintenance configuration, drain plug 48 is removed, and any of the working fluid trapped within isolated chamber 26c is drained, suctioned or otherwise extracted from isolated chamber 26c (step 208) though bleed port 50. The bleed port 50 is then fluidly coupled to fluid source 106 and pump 108 (step 210). The non-flammable fluid "F" is then pumped into isolated chamber 26c until the isolated chamber 26c is filled with non-flammable fluid "F" (step 212). A fluid pressure of the non-flammable fluid "F" is thereby exerted on ball segment 30 in a downstream direction and flapper doors 32, 34 in an upstream direction as indicated by arrows 54. The fluid pressure reinforces the fluid seals formed with respective valve seats 36, 40 and ensures that no flammable working fluid leaks through valve apparatus 10 from upstream fluid components 102. In some embodiments, this reinforcement force is sufficient to positively isolate downstream components 104 from any of the flammable working fluid upstream of valve seat 40, and thus provide a safe environment for maintaining downstream components 104. Since pump 108 is operable to adjust the fluid pressure within isolated chamber 26c, pump 108 is operable to adjust a sealing force applied by ball segment 30 and flapper doors 32, 34 and respective valve seats 36, 40.

The longitudinal overlap "O" enables isolated chamber 26c to be relatively small as compared to a conventional ball valve adjacent a conventional check valve. Thus, a relatively small quantity of non-flammable fluid "F" must be provided to fill isolated chamber 26c, and cost savings are realized.

The hot work or maintenance operations are safely carried out on downstream fluid components 104 (step 214) with valve apparatus 10 providing redundant isolation capabilities. Two positive isolation seals are provided at the two valve seats 36, 40. As appreciated by those skilled in the art, the two positive isolation seals provide the "double block" characteristics that enable safe maintenance operations on downstream fluid components 104. The fluid pressure provided by non-flammable fluid "F" is maintained throughout the maintenance operations by replacing the drain plug 48, or alternatively, by operating pump 108 continuously or intermittently.

When the hot work or maintenance operations are complete, fluid source 106 and pump 108 are disconnected from the bleed port 50. Non-flammable fluid "F" is extracted from the isolated chamber 26c, e.g., by suction or drained under the influence of gravity. Drain plug 48 is then replaced (step 216). Valve stem 38 is rotated to return ball segment 30 to the open position, and the working fluid is resupplied to inlet 26a to move flapper doors 32,34 to the open position to return valve apparatus 10 to the open or operational configuration (step 218) and normal operation of fluid system 100 is resumed.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A valve apparatus, comprising:
a ball segment valve housing;
a check valve housing coupled to the ball segment valve housing such that a longitudinal opening is defined through the ball segment valve housing and the check valve housing;
a ball segment disposed within the ball segment valve housing, the ball segment operable to be rotated to a closed position wherein a generally curved end of the ball segment is in sealing engagement with a ball segment valve seat disposed within the ball segment valve housing to prevent the flow of a working fluid through an outlet of the longitudinal opening, and operable to be rotated to an open position wherein the generally curved end of the ball segment is at least partially disengaged with the ball segment valve seat to permit flow of the working fluid through the outlet; and
at least one flapper door disposed within the check valve housing, the at least one flapper door operable to be rotated to:
a closed position wherein the at least one flapper door is in sealing engagement with a flapper valve seat to prevent flow of the working fluid through the longitudinal opening in a first direction, wherein the at least one flapper door is longitudinally spaced from the ball segment when the at least one flapper door and the ball segment are both in their respective closed positions to define an isolated chamber within the longitudinal opening between the at least one flapper door and the ball segment; and
an open position wherein the at least one flapper door permits flow of the working fluid through the flapper valve seat in a second direction, and wherein the at least one flapper door extends from the check valve housing into the ball segment valve housing such that the at least one flapper door longitudinally overlaps the ball segment when the at least one flapper door and the ball segment are both in their respective open positions.

2. The valve apparatus according to claim 1, further comprising a bleed valve extending between the isolated chamber and an exterior of the valve apparatus.

3. The valve apparatus according to claim 1, wherein the ball segment extends less than a full circumference and engages only a single ball segment valve seat.

4. The valve apparatus according to claim 1, wherein the ball segment is operable to be rotated about a pivot axis that is generally orthogonal to a longitudinal axis extending through the longitudinal opening, and wherein the at least one flapper door is operable to be rotated about a flapper axis that is generally orthogonal to the pivot axis of the ball segment.

5. The valve apparatus according to claim 1, wherein the at least one flapper door comprises a pair of flapper doors operable to rotate toward one another to a central location within the longitudinal opening.

6. The valve apparatus according to claim 5, wherein further comprising a biasing member disposed within the check valve housing and operable to urge the pair of flapper doors to the closed position.

7. A fluid system fin handling a flammable working fluid, the fluid system comprising:
an upstream fluid component;
a downstream fluid component;
a source of a pressurized non-flammable fluid; and
a valve apparatus having an inlet fluidly coupled to the upstream component and an outlet fluidly coupled to the downstream component such that a flow path is defined between the upstream fluid component and the downstream component through the valve apparatus, the valve apparatus comprising:
a ball segment operable to he rotated to a closed position wherein a generally curved end of the ball segment is in sealing engagement with ball segment valve seat to prevent flow of the working fluid through the outlet, and operable to be rotated to an open position wherein the generally curved end of the ball segment is at least partially disengaged with the ball segment valve seat to permit flow of the working fluid through the outlet; and at least one flapper door disposed operable to be rotated to a closed position wherein the at least one flapper door is in sealing engagement with a flapper valve seat to prevent flow of the working fluid through the inlet in a first direction, and operable to be rotated to an open position wherein the at least one flapper door is at least partially disengaged with the flapper valve seat to permit flow of the working, fluid through the inlet in a second direction;

an isolated chamber defined between the at least one flapper door and the ball segment when the at least one flapper door and the ball segment are both in their respective closed positions; and a bleed port extending between the isolated chamber and an exterior of the valve apparatus, the bleed port fluidly coupled to the source of the pressurized non-flammable fluid to permit the non-flammable fluid to pressurize the isolated chamber and thereby urge the ball segment toward the ball segment valve seat and at least one flapper door toward the flapper valve seat.

8. The fluid system according to claim 7, wherein the source or the pressurized non-flammable fluid comprises a pump operable to adjust a pressure of the non-flammable fluid within the isolated chamber.

9. The fluid system according to claim 8, wherein the pump is operable to provide the non-flammable fluid to the isolated chamber at a fluid pressure of at least 10,000 psi.

10. The fluid system according to claim 7, wherein the non-flammable fluid comprises a PTFE impregnated grease or paste.

11. The fluid system according to claim 7, wherein the at least one flapper door extends toward the ball segment in the open position thereof such that the at least one flapper door longitudinally overlaps the ball segment when the at least one flapper door and the ball segment are both in their respective open positions.

12. The fluid system according to claim 7, wherein the downstream component comprises at least one of a dehydrator, a separator and an accumulator pressure vessel operable to maintain the working fluid at a preselected pressure therein.

13. A method of fluidly isolating a downstream fluid component from an upstream fluid component in a fluid system for handling as flammable working fluid to facilitate safely maintaining the downstream fluid component, the method comprising the steps of:
(a) providing a check valve at downstream location with respect to the upstream component, the check valve including at least one flapper door operable to be rotated to a closed position wherein the at least one flapper door is in sealing engagement with a flapper valve seat to prevent flow of the working fluid in a first upstream direction, and operable to be rotated to an open position wherein the at least one flapper door is at least partially disengaged with the flapper valve seat to permit flow of the working fluid in a second downstream direction;
(b) providing a ball segment valve at a downstream location with respect to the check valve that is an upstream location with respect to the downstream component, the ball segment valve including a ball segment operable to be rotated to a closed position wherein a generally curved end of the ball segment is in sealing engagement with a ball segment valve seat to prevent flow of the working fluid through the ball segment valve, and operable to be rotated to an open position wherein the generally curved end of the ball segment is at least partially disengaged with the ball segment valve seat to permit flow of the working fluid through the ball segment valve;
(c) inducing the ball segment to rotate to the closed position thereof;
(d) inducing the at least one flapper door to rotate to the closed position thereof; and
(e) providing a pressurized non-flammable fluid to an isolated chamber defined between the at least one flapper door and the ball segment to thereby urge the ball segment toward the ball segment valve seat and at least one flapper door toward the flapper valve seat.

14. The method according to claim 13, wherein the step of providing the check valve comprises providing a biasing member in the check valve operable to urge the at least one flapper door toward the flapper valve seat, and wherein the step of inducing the at least one flapper door to rotate to the closed position thereof comprises interrupting a supply of the working fluid to the check valve such that an upstream force supplied by the biasing member is sufficient to move the at least one flapper door to the closed positron.

15. The method according 13, further comprising the step of adjusting a fluid pressure of the non-flammable fluid within the isolated chamber to thereby adjust a sealing force applied by the at least one flapper door against the flapper valve seat and a sealing force applied by the ball segment against the ball segment valve seat.

16. The method according to claim 13, further comprising the step of extracting working fluid from the isolated chamber subsequent to the steps of inducing the ball segment to rotate to the closed position thereof and inducing the at least one flapper door to rotate to the closed position thereof.

17. The method according to claim 13, further comprising the steps of performing hot work operations on the downstream component while the non-flammable fluid is provided to the isolated chamber, subsequently extracting the non-flammable fluid from the isolated chamber, and returning the at least one flapper door and the ball segment to the respective open positions thereof.

18. The method according to claim 17, wherein the step of returning the at least one flapper door and the ball segment to the respective open positions thereof comprises establishing a longitudinal overlap between the at least one flapper door and the ball segment.

* * * * *